United States Patent [19]
Kulischenko et al.

[11] 4,398,173
[45] Aug. 9, 1983

[54] SAFENESS INDICATOR FOR FLEXIBLE SHAFTS USED IN AUTOMOTIVE STEERING MECHANISMS

[75] Inventors: Walter Kulischenko, Middlesex, N.J.; Philip E. Bloomfield, Bala Cynwyd, Pa.

[73] Assignee: Pennwalt Corporation, Philadelphia, Pa.

[21] Appl. No.: 309,648

[22] Filed: Oct. 8, 1981

[51] Int. Cl.$^3$ .............................................. G08B 21/00
[52] U.S. Cl. ..................................... 340/52 R; 73/847; 180/271; 280/777; 340/679; 340/870.3
[58] Field of Search ............... 340/870.3, 52 R, 679, 340/27 R; 73/847; 180/271; 280/777

[56] References Cited
U.S. PATENT DOCUMENTS

| | | | |
|---|---|---|---|
| 3,293,585 | 12/1966 | Horn | 73/847 X |
| 3,509,942 | 5/1970 | Lindberg | 340/27 R |
| 3,596,269 | 7/1971 | Laska | 340/679 X |
| 3,936,071 | 2/1976 | Ricketts et al. | 340/52 R |
| 3,980,999 | 9/1976 | Nishioka et al. | 340/52 R |
| 3,988,027 | 10/1976 | Serizawa et al. | 280/777 |

*Primary Examiner*—David L. Trafton

[57] ABSTRACT

In a vehicle steering system for automobiles, for example, a steering column is provided with a rotatable flexible shaft at the end thereof for improving the ability of the column to absorb energy in a crash situation. The flexible shaft has at least one strip of a plastic material, preferably polyvinylidene fluoride film made piezoelectric by known methods, secured to an outermost winding of the flexible shaft. Turning the steering wheel will torsionally deflect the flexible shaft which causes the piezoelectric strips to generate millivoltages thereacross. A deteriorating flexible shaft will deflect more under torsional stress than a comparable newer flexible shaft and the piezoelectric strip or strips secured to the deteriorating shaft will consequently produce higher millivoltages. These millivoltages are amplified and fed to indicating means for indicating the degree of safeness of the flexible shaft.

10 Claims, 8 Drawing Figures

SAFENESS INDICATOR FOR FLEXIBLE SHAFTS USED IN AUTOMOTIVE STEERING MECHANISMS

STATEMENT OF THE INVENTION

This invention relates to steering mechanisms for automobiles, for example, and more particularly to means for indicating the degree of safeness of flexible shafts used in the steering mechanism.

BACKGROUND AND SUMMARY OF THE INVENTION

In the constant pursuit of improved safety for automobiles, for example, manufacturers have installed telescoping components which cooperate with the steering column upon frontal impact of the automobile to lessen the severity of injury to the driver. These mechanisms fulfill an important objective but add to the total cost and weight of the vehicle, the latter (weight) being a factor in the amount of energy required to move the vehicle.

In addition to telescoping components, flexible shafts have been used in steering mechanisms to also lessen driver injuries. Flexible shafts improve the ability of the steering column to absorb energy in a crash situation. The flexible shaft has one of its ends operably connected to the bottom of the steering shaft while its other end may be connected to some suitable tuned coupling means capable of absorbing considerable road induced shake. Such flexible shafts, over a period of years of being constantly torqued in both directions, have catastrophically failed resulting in a complete loss of steering control. Since driving habits of individual drivers vary widely as well as conditions under which the automobiles are driven, life expectancy of the flexible shafts used therein is not always predictable. Such flexible shafts may suddenly fail on a rapid turn of the steering wheel.

The present invention provides visual means for indicating the condition of the flexible shaft. Thus, the red or danger portion of the indicating means may be caused to light when the flexible shaft has sufficiently deteriorated, or its condition may be observed by electronic means when desired.

The indicating means is electrically connected to a piezoelectric film material secured to the outermost layer of windings of the rotatable flexible shaft. The film material is preferably polyvinylidene fluoride, referred to hereinafter as PVDF, suitably Kynar, a trademark product of Pennwalt Corporation, Philadelphia, Pa., assignee of the present invention. Stress applied to the piezoelectric film generates millivoltages thereacross when the flexible shaft is torqued in either direction in response to turning of the steering wheel. Of course, a flexible shaft approaching failure will exert more stress on the film, and hence, higher millivoltages will be generated than from torquing a flexible shaft in relatively good condition. The millivoltages are conventionally amplified and the amplified signals directed to the indicator for indicating safeness of the flexible shaft.

DETAILED DESCRIPTION OF THE INVENTION

Figure 1:
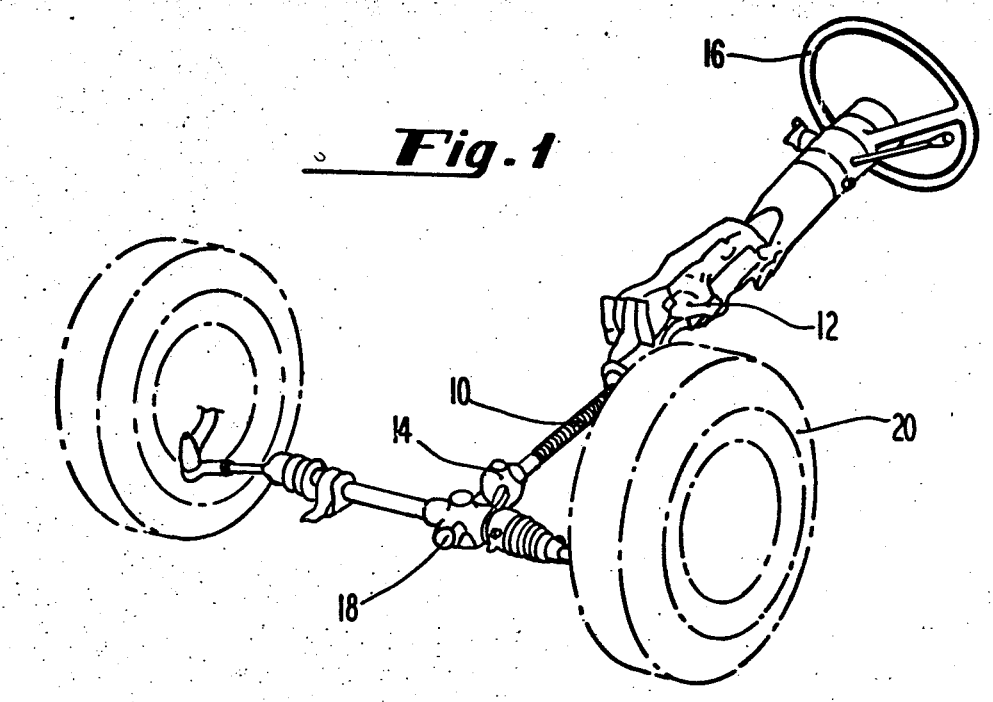
FIG. 1 is a diagrammatic illustration, in perspective, of a portion of an automobile employing a flexible shaft in its steering system.

In FIG. 1, rotatable flexible shaft 10 interconnects automobile steering column 12 and coupling member 14. Flexible shaft 10 enhances the ability of column 12 to absorb energy in a crash situation to thereby lessen the severity of injury to the driver.

Flexible shaft 10 is conventional and typically comprises a wire mandrel with a plurality of layers of closely coiled wires wound thereover, each of the layers being successively wound over another in alternately opposing directions, i.e., right or left-hand lay. A flexible shaft of this type is shown and described in U.S. Pat. No. 4,185,473, assigned to the present assignee.

Rotatable flexible shafts are of two basic types—power and remote control. Power driven flexible shafts are designed primarily for motor-driven or high speed operation in one direction. Remote control flexible shafts, on the other hand, are designed primarily for hand-operated control, usually 100 rpm or less, in either direction of rotation. The flexible shafts employed in the present invention are rotated in either direction of rotation at very slow speeds, and, although such application is ordinarily designated one of remote control, the primary function of the flexible shafts is to promote safety to the driver while transmitting torque from the steering wheel 16 to the rack and pinion steering mechanism 18, for example, to turn wheels 20 in a desired direction.

When transmitting torque, a flexible shaft exhibits torsional deflection, measured in degrees per foot of shaft per pound-inch of load. Torsional deflection of flexible shafts is described in aforementioned U.S. Pat. No. 4,185,473, incorporated herein by reference.

Torsional deflection of flexible shafts varies with the load transmitted thereby. The act of parking an automobile on city streets, for example, subjects the flexible shaft to considerable deflection. If done frequently over extended periods, the shaft weakens and may result in catastrophic failure.

Figure 2:
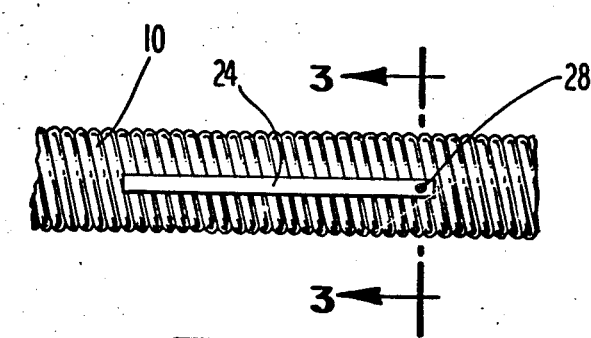
FIG. 2 is a plan view of a portion of the flexible shaft illustrated in FIG. 1.
Figure 3:
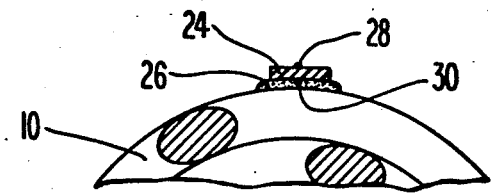
FIG. 3 is a sectional view of the flexible shaft of FIG. 2 taken along line 3—3 thereof.

In FIGS. 2 and 3, a thin strip of plastic material 24, preferably PVDF, is secured by a suitable electrically non-conducting adhesive or epoxy 26 to flexible shaft 10. PVDF is known to possess piezoelectric properties. Highly piezoelectric PVDF elements may be prepared in accordance with the teachings disclosed in U.S. Pat. No. 3,931,446 and U.S. Pat. No. 4,055,878, which elements are suitable for use in practicing the present invention. Piezoelectric film is commonly mechanically oriented during its manufacture. Its sensitivity therefor is highest when stressed in the orientation direction. Thus, in the embodiments of FIGS. 2, 4, 5, and 6, the indicated length direction of the piezoelectric film corresponds to orientation direction.

Figure 7:
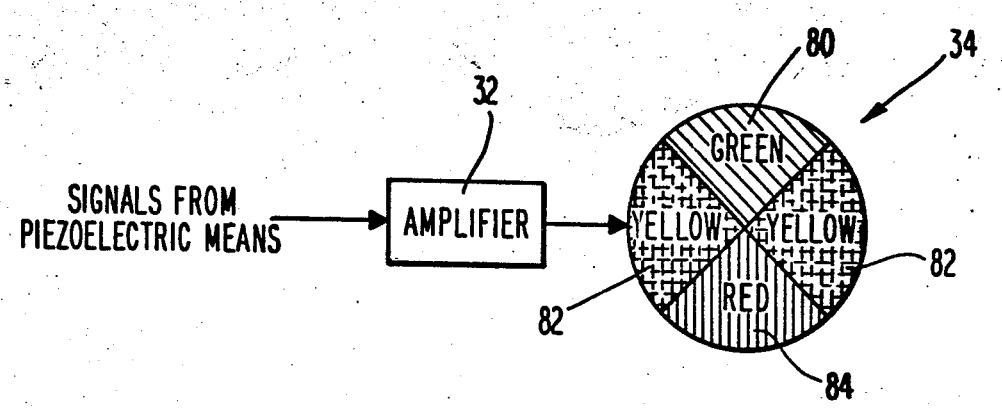
FIGS. 7 and 8 diagrammatically illustrate the flow of millivoltage signals to the indicating means.

Strip 24 is provided on both surfaces thereof with a suitable metallized coating, conventionally applied. Electrical conductors 28 and 30 are attached to outer surfaces of strip 24 as illustrated in FIG. 3 and fed into amplifier 32 (FIG. 7), typically an operational amplifier.

It is understood, of course, that under stress, one metallized surface of strip 24 becomes positive or negative with respect to the other metallized surface. Thus, as flexible shaft 10 is torsionally deflected upon turning of steering wheel 16, the entire strip 24 will contribute to the generation of millivoltage signals across wires 28 and 30, notwithstanding that steering wheel 16 may be turned slowly through several degrees only. It is appreciated, that flexible shaft 10, if in satisfactory condition, will not torsionally deflect excessively to thereby generate large millivoltage signals even if the steering wheel is turned or rotated rapidly, from one extreme to the other.

The millivoltage signals are then conventionally amplified by amplifier 32 and the amplified signals fed into an indicator 34, later described.

Figure 4:
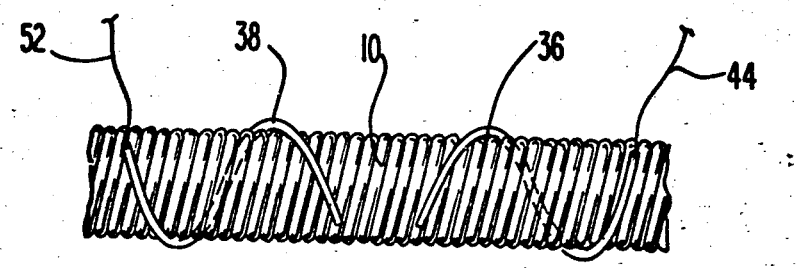
FIGS. 4, 5 and 6 are modifications of the piezoelectric film which is secured to the flexible shaft of FIG. 2.

Referring now to FIG. 4, a pair of piezoelectric strips 36 and 38 is helically wound around flexible shaft 10 in opposing directions and adhered thereto with electrically non-conducting adhesive or epoxy as aforedescribed. The flexible shaft illustrated in FIG. 4 is designated left-lay since the pitch of the outermost layer corresponds to a left-handed screw thread. Since the speed of rotation of the steering wheel, and hence flexible shaft 10, is extremely slow, compared to typical applications, the difference in generated millivoltages by strips 36 and 38 due to direction of rotation of the steering wheel is practically negligible. Nonetheless, strips 36 and 38 are helically wound such that one of the two will tighten upon rotation of the steering wheel in one direction and the other will tighten upon rotation of the steering wheel in the other direction. The strip which thus tightens will provide the signals to the indicator as described below.

Figure 8:
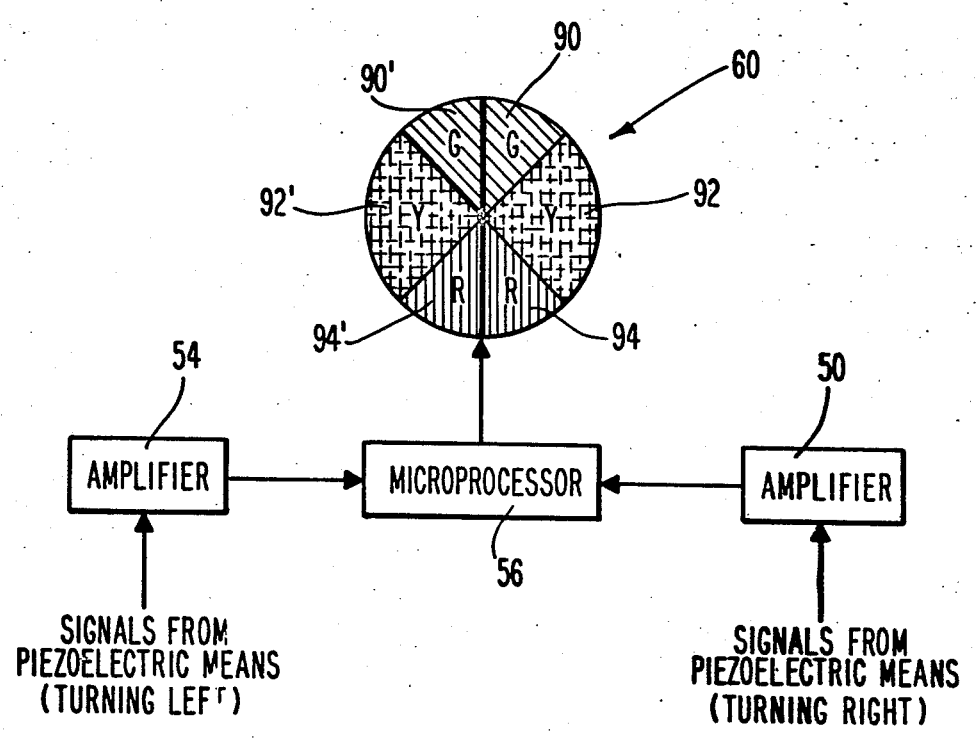

An electrical conductor 44 (only 1 shown) is attached to each of both metallized surfaces of helical strip 36. Signals generated from strip 36 are fed into an amplifier 50 (FIG. 8). Similarly, another conductor 52 (only 1 shown) is attached to each of both metallized surfaces of strip 38. Signals generated by strip 38 are fed into amplifier 54. Amplified signals from each of the amplifiers 50 and 54 are directed to a conventional microprocessor 56 which differentiates between torsional deflections caused by turning the steering wheel clockwise or counterclockwise for observation on indicator 60. It is noted, that notwithstanding torsional deflection is expected to be approximately equal in either direction of rotation of the steering wheel and flexible shaft, that the embodiment illustrated in the modification of FIG. 4 may provide an additional measure of reliability to the system.

Figure 5:
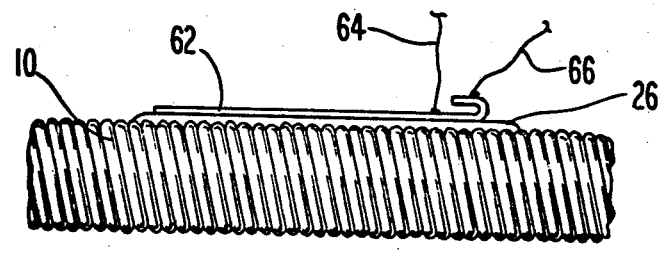

In FIG. 5, piezoelectric strip 62 is upturned or folded at one end in order that conductors 64 and 66 may both be conveniently connected to upper surfaces of the strip. If conductor 64 is connected to a surface having one polarity, then conductor 66 is automatically connected to the surface having the other polarity. Strip 62 is secured to flexible shaft 10 through electrically non-conducting adhesive or epoxy 26.

Figure 6:
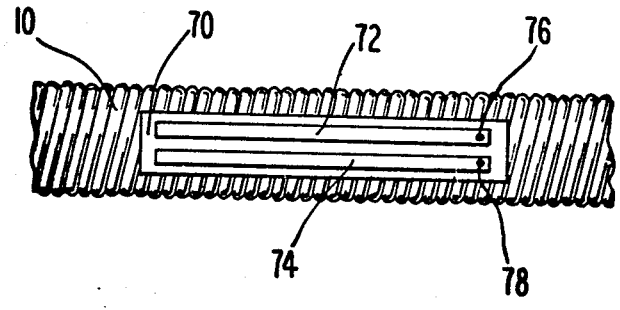

In FIG. 6, a thin plastic film base plane 70, preferably of the same PVDF material as the piezoelectric film, metallized on its upper surface, is secured to flexible shaft 10 by means of suitable electrically conducting adhesive or epoxy (not shown). A pair of piezoelectric strips 72 and 74 are adhered to base plane 70 by similar adhesive or epoxy means. The upper or exposed surfaces of strips 72 and 74 are of opposite polarity and is readily accomplished by simply cutting a longer strip metallized on both surfaces into two shorter strips 72 and 74 and inverting one with respect to the other. Thus, conductors 76 and 78 may be connected to the upper surfaces of strips 72 and 74 respectively. The voltage sensitivity of the strips of FIG. 6 possesses twice the sensitivity of the strip of FIG. 2. The embodiments illustrated in FIGS. 5 and 6 may be helically applied to the flexible shaft as the strips in FIG. 4 to provide higher sensitivities.

The safeness condition of flexible shaft 10 is visually indicated on indicators 34 or 60. Typically, the steering wheel will be turned full left or full right and the indicator activated. Alternatively, the indicators may constantly indicate the degree of safeness of the flexible shaft, or, as mentioned above, the red or danger sector of the indicator may be caused to light or glow when the flexible shaft has started to excessively deteriorate.

Indicator 34 (FIG. 7) comprises a green sector 80, or safe area; a pair of yellow sectors 82, or caution area; and a red sector 84, or danger area.

As the flexible shaft starts to deteriorate, it will deflect a greater amount under a given torsional stress to exert greater stresses on the piezoelectric strips to thereby produce higher millivoltage signals therefrom which cause indicator 34 to indicate same. Similarly, indicator 60 will indicate areas of safety, caution and danger, and additionally, is capable of informing the driver of a possible incongruous condition in the flexible shaft when the steering wheel is turned in one direction which may alert the driver to take immediate remedial measures. As aforementioned, indicator 60 also provides an additional modicum of reliability of the safeness of flexible shaft 10. Indicator 60 comprises safe, caution, and danger areas 90, 92, and 94 respectively for indicating degrees of safeness of the flexible shaft when the steering wheel is turned to the right. Counterpart areas 90', 92', and 94 indicate degrees of safeness of the flexible shaft when the steering wheel is turned to the left.

All PVDF strips aforediscussed possess pyroelectric properties as well as piezoelectric properties. Automatic temperature compensating means adjacent the piezoelectric strip or strips may readily be achieved via suitable transistors and thermistors (not shown) well known in the industry. Further, ageing the PVDF strip material by subjecting it to sufficiently high temperatures for improving its heat stability prior to its adherence to the flexible shaft is known and may be accomplished by conventional means. The electrically non-conducting and conducting adhesive or epoxy material is preferably of a heat-resistant type even though the temperature of the PVDF strips, in actual use, is not expected to exceed about 150° F. which the strips can readily withstand without affecting their piezoelectric properties.

Triggering of appropriate lights in the indicators, deflection of needles therein, and the like, by the amplified electrical or millivoltage signals are accomplished by conventional means and are not herein shown or described.

It is appreciated that the piezoelectric films herein disclosed produce electric currents when stressed. Hence, current or charge output can readily be monitored as well as millivoltage signals.

The invention is not intended to be limited to automotive steering systems. For example, the inventive devices may be employed to monitor the bending or twisting of flexible shaft single rotor aircraft, and the like.

We claim:

1. Safety indicating unit for indicating condition of safeness of a flexible shaft rotating in response to rotation of a steering wheel in a vehicle steering system wherein deterioration of said flexible shaft produces greater torsional deflection thereof when said steering wheel is rotated in either direction, said unit comprising
   a plastic member having piezoelectric properties, said member secured to an outermost layer of windings of said flexible shaft,
   means for generating electrical signals by said plastic piezoelectric member in proportion to torsional deflection of said flexible shaft, and
   other means for indicating said generated electrical signals into an indication of safeness of said torsionally deflected flexible shaft.

2. The unit of claim 1 wherein said other means is a visual indicator for indicating degree of safeness of said flexible shaft when torsionally deflected by rotation of said steering wheel.

3. The unit of claim 2 wherein said plastic piezoelectric member is a film strip of polyvinylidene fluoride, and said film strip is provided with a metallized coating on both surfaces thereof.

4. The unit of claim 3 wherein said strip is secured to said outermost layer with an electrically non-conducting adhesive material.

5. The unit of claim 4 wherein said strip is disposed longitudinally said flexible shaft,
   an electrical conductor attached to each surface of said strip adjacent an end thereof,
   an amplifier disposed in proximate relationship to said strip, said electrical conductors transmitting electrical signals generated by said piezoelectric strip to said amplifier for amplifying said transmitted electrical signals, and
   means for translating said amplified electrical signals into an indication of safeness of said torsionally deflected flexible shaft.

6. The unit of claim 4 wherein said strip is provided with an upturned end,
   an electrical conductor attached to an upper surface of said strip adjacent said upturned end,
   another electrical conductor attached to an upper surface of said upturned end, each of said conductors being connected to a metallized surface of opposite polarity of said strip.

7. Safety indicating unit for indicator condition of safeness of a flexible shaft rotating in response to rotation of a steering wheel in a vehicle steering system wherein deterioration of said flexible shaft produces greater torsional deflection thereof when said steering wheel is rotated in either direction, said unit including
   a base plane comprising a plastic film sheet having piezoelectric properties, said sheet being provided with a metallized coating on upper surface thereof and secured to an outermost layer of windings of said flexible shaft with an electrically conducting adhesive material,
   a pair of plastic piezoelectric strips adhered on said upper surface of said base plane by electrically conducting adhesive material, said strips each provided with a metallized coating on both surfaces thereof, exposed surfaces of said strips being of opposite polarity,
   means for generating electrical signals by said strips in proportion to torsional deflection of said flexible shaft, and
   other means for translating said generated electrical signals into an indication of safeness of said torsionally deflected flexible shaft.

8. The unit of claim 7 wherein the strips of said pair of strips are adhered to said base plane in parallel relationship.

9. Safety indicating unit for indicating condition of safeness of a flexible shaft rotating in response to rotation of a steering wheel in a vehicle steering system wherein deterioration of said flexible shaft produces greater torsional deflection thereof when said steering wheel is rotated in either direction, said unit comprising
   a pair of plastic piezoelectric strips disposed helically about said flexible shaft, each strip of said pair of strips disposed helically with an opposite pitch and spaced longitudinally along said flexible shaft, each of said strips being metallized on both surfaces thereof, each of said metallized surfaces having an electrical conductor attached thereto adjacent an end portion thereof, each surface of each strip being of opposite polarity,
   means for generating separate electrical signals by each of said strips in proportion to torsional deflection of said flexible shaft, said separate electrical signals comprising signals generated by one of said pair of strips in response to rotation of said steering wheel and flexible shaft in one direction and other signals generated by other of said pair of strips in response to rotation of said steering wheel and flexible shaft in other direction, and
   other means for translating said generated electrical signals into an indication of safeness of said torsionally deflected flexible shaft when rotated in one direction and in the other direction.

10. The unit of claim 9 further characterized by an amplifier disposed adjacent each of said helical piezoelectric strips for amplifying electrical signals generated by each of said strips,
   a microprocessor downstream said amplifiers for differentiating between signals fed into said other means generated by said strips when said steering wheel and flexible shaft are rotated in one direction and in the other direction.

* * * * *